US012601281B2

(12) United States Patent
Miller et al.

(10) Patent No.: US 12,601,281 B2

(45) Date of Patent: Apr. 14, 2026

(54) TURBINE ENGINE HAVING A PLURALITY OF LUBRICANT STRUTS, EACH DEFINING A LUBRICANT STRUT FLOWPATH

(71) Applicant: General Electric Company, Evendale, OH (US)

(72) Inventors: Brandon W. Miller, Middletown, OH (US); Andrew Hudecki, Milford, OH (US); Ryan T. Roehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/883,610

(22) Filed: Sep. 12, 2024

(65) Prior Publication Data

US 2026/0071556 A1 Mar. 12, 2026

(51) Int. Cl.
*F01D 25/18* (2006.01)
*F01D 25/20* (2006.01)

(52) U.S. Cl.
CPC ............ *F01D 25/20* (2013.01); *F01D 25/18* (2013.01); *F05D 2220/36* (2013.01); *F05D 2260/4031* (2013.01)

(58) Field of Classification Search
None
See application file for complete search history.

(56) References Cited

U.S. PATENT DOCUMENTS 5,411,116 A 5/1995 Kish et al.
7,237,378 B2 7/2007 Lardellier
8,181,746 B2 5/2012 Szolomayer et al.
8,956,106 B2 2/2015 Fang et al.
9,546,565 B2 1/2017 Wiedemann et al.
10,634,053 B2 * 4/2020 Schwarz ............ F16H 57/0471
10,787,928 B2 * 9/2020 Tompkins ............ F01D 25/16
11,795,841 B2 10/2023 Black et al.
2006/0042223 A1 * 3/2006 Walker ............ F01D 9/065 60/39.08

(Continued)

FOREIGN PATENT DOCUMENTS

EP 1316678 B1 8/2012
EP 1520961 B1 6/2017

(Continued)

OTHER PUBLICATIONS

Miller et al., U.S. Appl. No. 63/678,742, filed Aug. 2, 2024.

*Primary Examiner* — Gerald L Sung
*Assistant Examiner* — Jacek Lisowski
(74) *Attorney, Agent, or Firm* — Venable LLP; Michele V. Frank

(57) ABSTRACT

A turbine engine includes a turbo-engine, a fan, a frame, and a lubrication system. The turbo-engine includes a core air flowpath. The fan is drivingly coupled to the turbo-engine. The frame supports the core air flowpath and includes a plurality of lubricant struts that extend through the core air flowpath. The lubrication system includes a sump having a lubricant therein, a scavenge reservoir, and a lubricant strut flowpath disposed through each of the plurality of lubricant struts. The lubricant strut flowpath is in fluid communication with the sump and the scavenge reservoir. The lubricant strut flowpath of each of the plurality of lubricant struts directs the lubricant from the sump to the scavenge reservoir.

20 Claims, 5 Drawing Sheets

(56) References Cited

U.S. PATENT DOCUMENTS

| | | | | |
|---|---|---|---|---|
| 2014/0182972 | A1* | 7/2014 | Hetherington | F02C 7/06 184/6.11 |
| 2016/0032773 | A1* | 2/2016 | James | F01D 25/16 416/170 R |
| 2017/0175874 | A1* | 6/2017 | Schwarz | F16H 57/0479 |
| 2020/0284337 | A1* | 9/2020 | Gebhard | F16H 57/0441 |
| 2024/0191659 | A1 | 6/2024 | Brown et al. | |

FOREIGN PATENT DOCUMENTS

| | | | |
|---|---|---|---|
| FR | 3127024 | A1 | 3/2023 |
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130874 | A1 | 6/2023 |
| FR | 3130875 | A1 | 6/2023 |
| FR | 3130877 | A1 | 6/2023 |
| FR | 3130895 | A1 | 6/2023 |

* cited by examiner

TURBINE ENGINE HAVING A PLURALITY OF LUBRICANT STRUTS, EACH DEFINING A LUBRICANT STRUT FLOWPATH

TECHNICAL FIELD

The present disclosure relates generally to a turbine engine, and more particularly to a turbine engine including a lubrication system.

BACKGROUND

Turbine engines, for example, for aircraft, generally include a fan and a turbo-engine arranged in flow communication with one another. A gearbox assembly transfers torque and power from one rotating component to another rotating component (e.g., from the turbo-engine to the fan). A lubrication system provides lubricant to one or more components of the gearbox assembly.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

FIG. 3A shows the turbine engine in a first rotational position.

DETAILED DESCRIPTION

Figure 1:
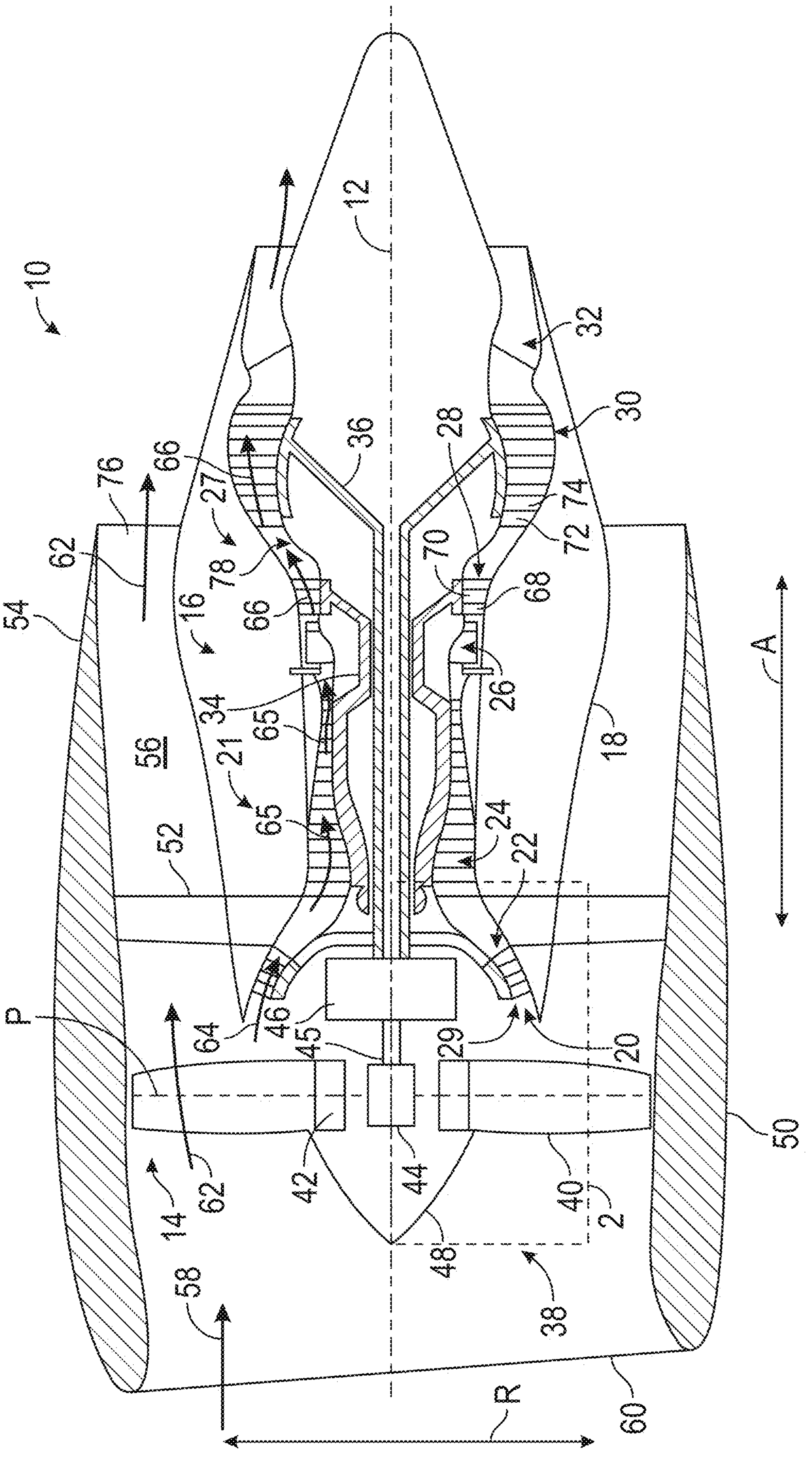
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is farther away from the propeller or the fan. When the turbine engine is configured in a pusher configuration, the fan is positioned on an aft side of the turbofan engine such that forward refers to a position that is farther away from the fan and aft refers to a position that is closer to the fan.

As used herein, the terms "axial" and "axially" refer to directions and orientations that extend substantially parallel to a longitudinal centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the longitudinal centerline of the turbine engine.

As used herein, "top" refers to a highest or uppermost point, portion, or surface of a component in the orientations shown in the figures.

As used herein, "bottom" refers to a lowest or lowermost point, portion, or surface of a component in the orientations shown in the figures.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

The present disclosure provides for a lubrication system for a gearbox assembly of a turbine engine. The turbine engine includes a core air flowpath through which core air is introduced, compressed (through one or more compressors), mixed with fuel to combust and to generate combustion gases (in a combustor), expanded (through one or more turbines), and exhausted from the turbine engine to produce thrust. The gearbox assembly, also referred to as a power gearbox, is utilized to transfer power and torque from a turbine shaft, such as a low-pressure shaft, to the fan of the turbine engine.

Such a gearbox assembly requires a large amount of lubricant (e.g., oil) to ensure continued operation, high efficiency, and adequate heat rejection. The large amount of lubricant that must be supplied and scavenged leads to significant packaging problems relative to the core air flowpath of the turbine engine. The gearbox assembly takes up a majority of the space under the core air flowpath. Accordingly, the space required to scavenge the lubricant directly pushes the core air flowpath outward, thus, challenging a fan hub radius ratio of the fan and an inlet radius ratio of the core air flowpath, which leads to additional weight and reduced efficiency of the turbine engine. This problem is exacerbated even further when aircraft maneuvers are considered. For example, the scavenge pickup must always be covered positively by the lubricant even while the aircraft rolls, banks, or turns. To account for the rolls, banks, and turns, the turbine engine may need as many as three large scavenge elements (e.g., pumps and reservoirs) and scavenge ports that must be packaged within the space radially inward of the core air flowpath. This leads to a very large main lubricant pump and scavenge pump that adds significant packaging pressure. The packaging restraints are further realized when the turbine engine includes an accessory gearbox in addition to the power gearbox. Such a configuration provides for 1% fuel burn increase when the turbine engine includes an accessory gearbox, thus, making the use of an accessory gearbox infeasible.

Some turbine engines include a single lubricant strut through which the lubricant can flow into the scavenge element for lubricating one or more bearings of the turbine engine. The bearings, however, require much less lubricant than the gearbox assembly. Thus, if such a lubricant strut is used for scavenging lubricant from a gearbox assembly, the lubrication system would be unable to scavenge the lubricant when the aircraft rolls, banks, or turns. In particular, the lubricant could lose contact with the lubricant strut during such rolls, banks, or turns, and, thus, prevent the lubrication system from being able to scavenge the lubricant through the lubricant strut. This leads to lubricant interruptions and excessive heat generation due to reduced lubrication during such lubricant interruptions. Further, the lubricant level increases due the lubricant not being scavenged during such instances, and may contact the gears of the gearbox assembly, and, thus, the gears can churn the lubricant as the gears are submerged in the lubricant.

Accordingly, the present disclosure provides for a lubrication system having a plurality of oil wetted struts, also referred to as lubricant struts, that are joined outside the core air flowpath at a common scavenge collector, also referred to as a scavenge reservoir, where a single scavenge element (e.g., scavenge pump) can pump the lubricant from the scavenge reservoir. The lubricant struts are each in fluid communication with the scavenge reservoir. The plurality of lubricant struts is spaced circumferentially about the gearbox assembly such that the lubricant maintains contact with at least one of the lubricant struts even when the aircraft rolls, banks, or turns. Thus, the scavenge reservoir remains covered with lubricant even during rolls, banks, or turns.

Accordingly, the lubrication system and methods detailed herein allow for draining of the lubricant into the scavenge reservoir despite the gearbox assembly being in a rotated position when an aircraft rotates. This prevents flooding of the gearbox assembly and allows the lubrication system to continue to cycle the lubricant through the gears consistently, even when the aircraft is in a rotated position. The lubrication system disclosed herein prevents lubricant interruptions and prevents the lubricant from increasing and contacting the gears regardless of the rotational position of the turbine engine. Thus, the lubrication system prevents the gears from being submerged in the lubricant. In this way, the lubrication system prevents excess windage (e.g., friction due to the gears rotating through the lubricant) in the gearbox assembly.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flowpath 29.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62 is routed into the bypass airflow passage 56, and a second portion of air, also referred to as core air 64, is routed into the upstream section of the core air flowpath 29 through the core inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
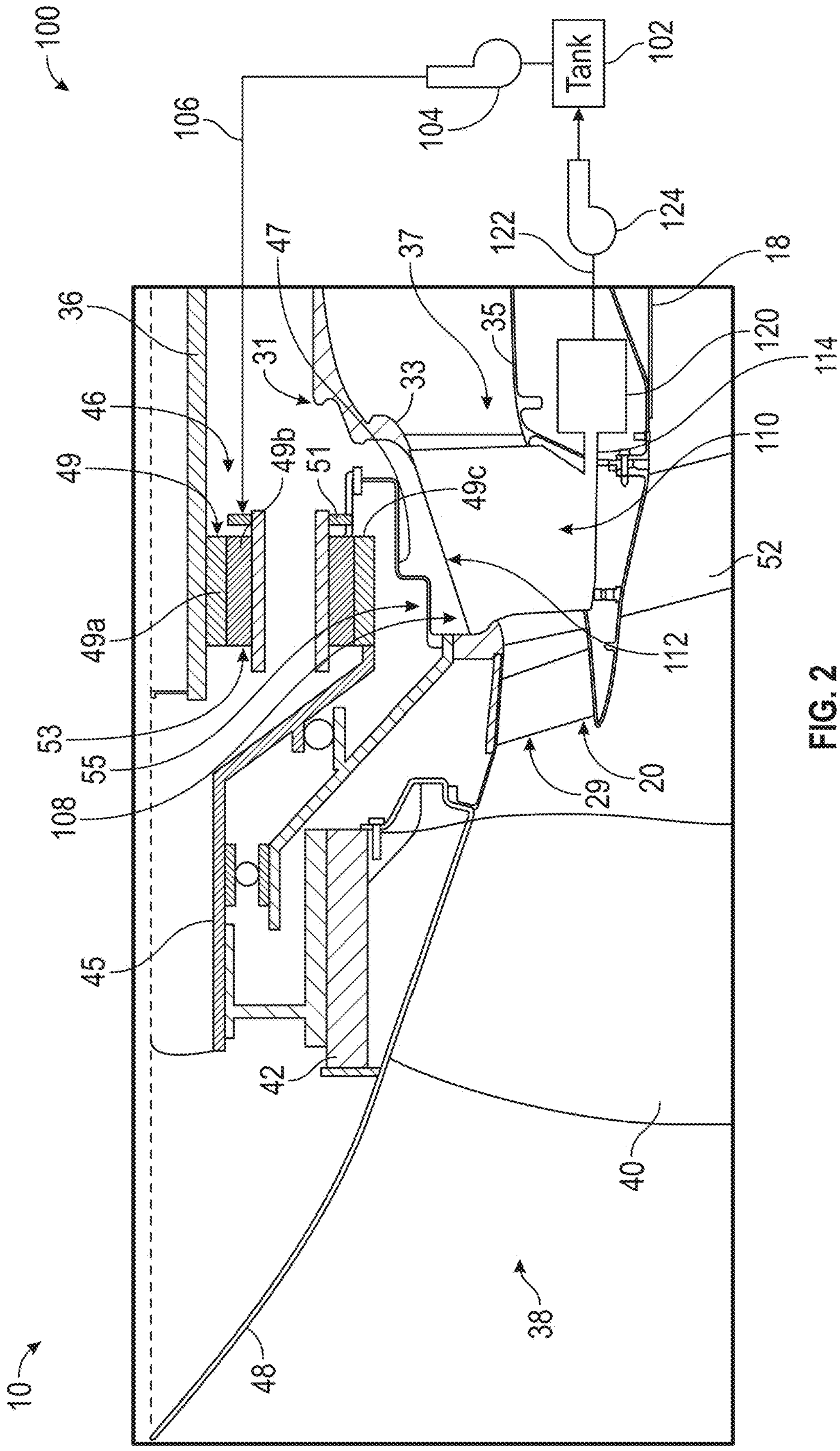
FIG. 2 is an enlarged partial schematic cross-sectional diagram of the turbine engine of FIG. 1, taken at detail 2 in FIG. 1, with a lubrication system, according to the present disclosure.

FIG. 2 is an enlarged partial schematic cross-sectional diagram of the turbine engine 10, taken at detail 2 in FIG. 1, with a lubrication system 100, according to the present disclosure. As shown in FIG. 2, the turbine engine 10 includes a frame 31 that supports the core air flowpath 29. The frame 31 includes a radially inner frame wall 33 and a radially outer frame wall 35. The core air flowpath 29 is defined between the radially inner frame wall 33 and the radially outer frame wall 35. The frame 31 includes a plurality of oil wetted struts, also referred to as a plurality of lubricant struts 37, that extends from radially inner frame wall 33 to the radially outer frame wall 35. The plurality of lubricant struts 37 supports the radially inner frame wall 33 and the radially outer frame wall 35. The plurality of lubricant struts 37 is positioned axially between the core inlet 20 and the compressor section 21 (e.g., the LP compressor 22) (FIG. 1). Each of the plurality of lubricant struts 37 includes a lubricant strut flowpath such that lubricant can flow through the lubricant struts 37, as detailed further below.

As further shown in FIG. 2, the gearbox assembly 46 includes a gearbox housing 47 and a gear assembly having a plurality of gears 49 disposed within the gearbox housing 47. The plurality of gears 49 includes a first gear 49*a*, one or more second gears 49*b*, and a third gear 49*c*. The second gears 49*b* are secured by a planet carrier 51. In FIG. 2, the first gear 49*a* is a sun gear, the one or more second gears 49*b* are planet gears, and the third gear 49*c* is a ring gear. The plurality of gears 49 can be arranged as an epicyclic gear assembly. When the plurality of gears 49 is an epicyclic gear assembly, the one or more second gears 49*b* include a plurality of second gears 49*b* (e.g., two or more second gears 49*b*). For example, the one or more second gears 49*b* include five second gears 49*b* (shown in FIG. 3A), but can include any number of second gears 49*b*.

In the epicyclic gear assembly, the plurality of gears 49 can be arranged in a star configuration, also referred to as a rotating ring gear configuration (e.g., the third gear 49*c* is rotating and the planet carrier 51 is fixed and stationary). In such an arrangement, the fan 38 is driven by the third gear 49*c*. For example, the third gear 49*c* is coupled to the fan shaft 45 such that rotation of the third gear 49*c* causes the fan shaft 45, and, thus, the fan 38, to rotate. In this way, the third gear 49*c* is an output of the gearbox assembly 46. However, other suitable types of gear assemblies may be employed. In one non-limiting embodiment, the plurality of gears 49 is arranged in a planetary configuration, in which the third gear 49*c* is held fixed, with the planet carrier 51 allowed to rotate. In such an arrangement, the fan 38 is driven by the planet carrier 51. For example, the planet carrier 51 is coupled to the fan shaft 45 such that rotation of the planet carrier 51 causes the fan shaft 45, and, thus, the fan 38, to rotate. In this way, the one or more second gears 49*b* (e.g., the planet carrier 51) are the output of the gearbox assembly 46. In another non-limiting embodiment, the plurality of gears 49 can be arranged in a differential gear configuration in which the third gear 49*c* and the planet carrier 51 are both allowed to rotate. While an epicyclic gear assembly is detailed herein, the plurality of gears 49 can include any type of gears including, for example, compound gears, multiple stage gears, or the like.

The one or more second gears 49*b* each includes one or more bearings 53 disposed therein. In this way, the gear assembly includes the one or more bearings 53. The one or more bearings 53 enable the one or more second gears 49*b* to rotate about the one or more bearings 53. The one or more bearings 53 can include any type of bearing for a gear, such as, for example, journal bearings, roller bearings, or the like. Any of the gears 49 can include bearings 53.

The first gear 49*a* is coupled to an input shaft of the turbine engine 10. For example, the first gear 49*a* is coupled to the LP shaft 36 such that rotation of the LP shaft 36 causes the first gear 49*a* to rotate. Radially outward of the first gear 49*a*, and intermeshing therewith, is the one or more second gears 49*b* that are coupled together and supported by the planet carrier 51 (shown schematically). The planet carrier 51 supports and constrains the one or more second gears 49*b* such that the each of the one or more second gears 49*b* is enabled to rotate about a corresponding axis of each second gear 49*b* without rotating about the periphery of the first gear 49*a*. Radially outwardly of the one or more second gears 49*b*, and intermeshing therewith, is the third gear 49*c*, which is an annular ring gear. The third gear 49*c* is coupled via an output shaft to the fan 38 and rotates to drive rotation of the fan 38 about the longitudinal centerline axis 12. For example, the fan shaft 45 is coupled to the third gear 49*c*. Radially outward of the third gear 49*c* is a lubricant gutter 55. The lubricant gutter 55 is defined by the gearbox housing 47 and collects lubricant that sprays or that drains from the gears 49 (e.g., the third gear 49*c*) or the bearings 53. The lubricant gutter 55 is annular about the longitudinal centerline axis 12 (e.g., about the gears 49).

The lubrication system 100 includes a tank 102 that stores a lubricant 101 (FIGS. 3A and 3B) therein, a lubricant pump 104, and a lubricant supply line 106. Preferably, the lubricant 101 is oil. The lubricant 101 can be any type of lubricant for lubricating the gears 49 (e.g., the first gear 49*a*, the one or more second gears 49*b*, or the third gear 49*c*) or the one or more bearings 53. The lubricant pump 104 is in fluid communication with the tank 102 and the lubricant supply line 106. The lubricant supply line 106 is in fluid communication with the gearbox assembly 46. The lubricant pump 104 pumps the lubricant 101 from the tank 102 to the gearbox assembly 46 through the lubricant supply line 106 for supplying the lubricant 101 to the gearbox assembly 46 (e.g., to the gears 49 or to the bearings 53), as detailed further below. In some embodiments, the lubrication system 100 supplies the lubricant 101 from the tank 102 to the gearbox assembly 46 without a pump, for example, by gravity or by centrifugal force due to rotation of the planet carrier 51 in the planetary arrangement of the gears 49.

The lubrication system 100 includes a sump 108 within the turbine engine 10 and in fluid communication with the gearbox assembly 46. In one embodiment, the sump 108 is located within the gearbox assembly 46 (e.g., within the gearbox housing 47). The sump 108 is a reservoir that collects and stores the lubricant 101 that drains from the gears 49 or the bearings 53. The sump 108 is in fluid communication with the lubricant gutter 55 to receive the lubricant 101 from the lubricant gutter 55. For example, the lubricant gutter 55 can include one or more gutter apertures such that the lubricant drains from the lubricant gutter 55 into the sump 108 through the gutter apertures.

The lubrication system 100 also includes a lubricant strut flowpath 110 that is in fluid communication with the sump 108. The lubricant strut flowpath 110 is disposed through a respective lubricant strut 37. In this way, each of the plurality of lubricant struts 37 includes a lubricant strut flowpath 110, as detailed further below. The lubricant strut flowpath 110 includes a lubricant strut flowpath inlet 112 and a lubricant strut flowpath outlet 114. The lubricant strut flowpath inlet 112 is in fluid communication with the sump 108 (e.g., via one or more strut apertures in the lubricant struts 37 or via a lubricant line from the sump 108 to the lubricant strut flowpath 110). In this way, the lubricant strut flowpath 110 receives the lubricant 101 from the sump 108 through the lubricant strut flowpath inlet 112.

The lubrication system 100 includes a scavenge reservoir 120 and a scavenge line 122. The scavenge reservoir 120 is in fluid communication with the lubricant strut flowpath 110 and with the tank 102. For example, the scavenge reservoir 120 is in fluid communication with the lubricant strut flowpath outlet 114 such that the lubricant 101 flows into the scavenge reservoir 120 through the lubricant strut flowpath outlet 114. The scavenge reservoir 120 is positioned radially outward of the core air flowpath 29. For example, the scavenge reservoir 120 is positioned within the outer casing 18. Such a configuration allows for a common scavenge reservoir for the plurality of lubricant struts 37 that is positioned outside of the core air flowpath 29, and, thus, does not interfere with the limited size of the area radially within the core air flowpath 29. The scavenge reservoir 120 is a tank, a tube, or the like for collecting the lubricant 101 from each of the plurality of lubricant struts 37.

The lubrication system 100 includes a scavenge pump 124 in fluid communication with the scavenge reservoir 120 and the scavenge line 122. The scavenge pump 124 pumps the lubricant 101 and pumps air within the scavenge reservoir 120 or the scavenge line 122 that has leaked into the scavenge reservoir 120 during operation of the turbine engine 10. The scavenge pump 124 is a suction pump that generates suction to pull the lubricant 101 and/or the air through the scavenge line 122 and towards the tank 102. The scavenge pump 124 includes a single scavenge pump that can pump the lubricant 101 from the scavenge reservoir 120. In some embodiments, the lubrication system 100 supplies the lubricant 101 from the scavenge reservoir 120 to the tank 102 without a pump, for example, by gravity, by centrifugal force due to rotation of the planet carrier 51 in the planetary arrangement of the gears 49, or by the lubricant pump 104.

Figure 3A:
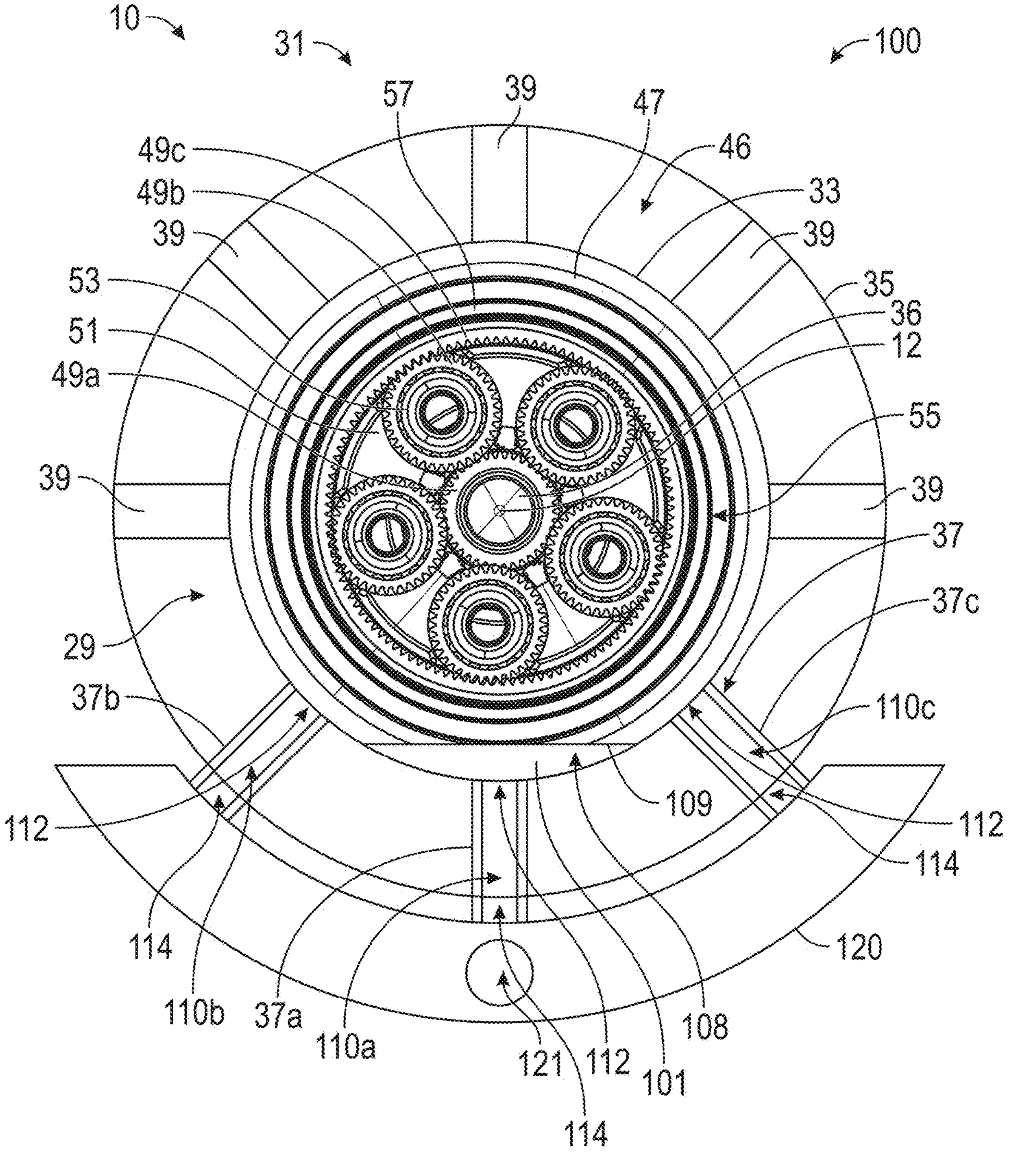
FIG. 3A is a schematic axial end view of a lubrication system for the turbine engine of FIG. 1, according to the present disclosure.

FIG. 3A is a schematic axial end cross-sectional view of the lubrication system 100 with the turbine engine 10 in a first rotational position. The turbine engine 10 can be viewed with respect to a "clock" orientation having a twelve o'clock position, a three o'clock position, a six o'clock position, and a nine o'clock position, in the orientation of the turbine engine 10 in FIG. 3A. Although not provided with reference numerals, the clock orientation is understood to include all clock positions therebetween.

As shown in FIG. 3A, each of the plurality of lubricant struts 37 is fluidly coupled to the scavenge reservoir 120. In particular, the lubricant strut flowpath 110 of each of the plurality of lubricant struts 37 is in fluid communication with the scavenge reservoir 120 (e.g., via the lubricant strut flowpath outlet 114). The plurality of lubricant struts 37 is spaced circumferentially about the longitudinal centerline axis 12. The plurality of lubricant struts 37 is positioned in a bottom portion of the turbine engine 10, for example, between the three o'clock position and the nine o'clock position.

The plurality of lubricant struts 37 includes a first lubricant strut 37*a*, a second lubricant strut 37*b*, and a third lubricant strut 37*c*. In the first rotational position shown in FIG. 3A, the first lubricant strut 37*a* is positioned at the six o'clock position. The second lubricant strut 37*b* and the third lubricant strut 37*c* help to drain the lubricant 101 from the sump 108 when the turbine engine 10, and, thus, the gearbox assembly 46, changes rotational position. For example, when the turbine engine 10 powers an aircraft, the aircraft turns, banks, or rolls such that the turbine engine 10, and, thus, the gearbox assembly 46, changes the rotational position. The second lubricant strut 37*b* is positioned on a first circumferential side of the first lubricant strut 37*a*. The third lubricant strut 37*c* is positioned on a second circumferential side of the first lubricant strut 37*a*. For example, the second lubricant strut 37*b* is positioned generally between the six o'clock position and the nine o'clock position. The third lubricant strut 37*c* is positioned generally between the three o'clock position and the six o'clock position.

The first lubricant strut 37*a*, the second lubricant strut 37*b*, and the third lubricant strut 37*c* each includes a lubricant strut flowpath 110 having a lubricant strut flowpath inlet 112 and a lubricant strut flowpath outlet 114. The first lubricant strut 37*a* includes a first lubricant strut flowpath 110*a*, the second lubricant strut 37*b* includes a second lubricant strut flowpath 110*b*, and the third lubricant strut 37*c* includes a third lubricant strut flowpath 110*c*.

The scavenge reservoir 120 extends partially circumferentially about the core air flowpath 29. In particular, the scavenge reservoir 120 is positioned radially outward of the radially outer frame wall 35 and extends partially circumferentially about the radially outer frame wall 35. In this way, the scavenge reservoir 120 is arc shaped. Such a configuration allows each of the plurality of lubricant struts 37 to be in fluid communication with the scavenge reservoir 120. Accordingly, a single scavenge reservoir 120 is provided to receive the lubricant 101 from each of the plurality of lubricant struts 37. In some embodiments, the scavenge reservoir 120 is annular about the core air flowpath 29 such that the scavenge reservoir 120 extends entirely circumferentially about the core air flowpath 29 (e.g., the radially outer frame wall 35). The scavenge reservoir 120 includes a scavenge reservoir outlet 121 in fluid communication with the scavenge line 122 (FIG. 2) for directing the lubricant 101 from the scavenge reservoir 120 to the scavenge line 122.

As further shown in FIG. 3A, the turbine engine includes one or more structural struts 39 that extend from radially inner frame wall 33 to the radially outer frame wall 35. The one or more structural struts 39 support the radially inner frame wall 33 and the radially outer frame wall 35. The structural struts 39 are spaced circumferentially about the longitudinal centerline axis 12. In particular, the structural struts 39 are positioned in a top portion of the turbine engine, particularly, between the nine o'clock position and the three o'clock position. The one or more structural struts 39 are positioned axially between the core inlet 20 and the compressor section 21 (e.g., the LP compressor 22) (FIG. 1) such that the one or more structural struts 39 are axially aligned with the plurality of lubricant struts 37. In this way, the turbine engine 10 includes both lubricant struts 37 and structural struts 39. In some embodiments, the structural struts 39 can include a lubricant strut flowpath 110 such that the structural struts 39 are lubricant struts 37 as well. In such embodiments, every strut can be a lubricant strut 37.

The third gear 49*c* includes a third gear flange 57 for coupling the third gear 49*c* to a static structure of the turbine engine 10. The sump 108 is defined radially between the third gear flange 57 and the core air flowpath 29. In particular, the sump 108 is defined radially between the third gear flange 57 and the radially inner frame wall 33. In this way, the lubricant 101 in the sump 108 collects on the radially inner frame wall 33 due to gravity and is in fluid communication with at least one of the plurality of lubricant struts 37. The lubricant 101 in the sump 108 remains in fluid communication with at least one of the plurality of lubricant struts 37 even if the turbine engine 10 (e.g., the gearbox assembly 46) rotates.

With reference to FIGS. 2 and 3A, in operation, the LP shaft 36 rotates, as detailed above, and causes the first gear 49*a* to rotate. The first gear 49*a*, being intermeshed with the one or more second gears 49*b*, causes the one or more second gears 49*b* to rotate about their corresponding axis of rotation. The one or more second gears 49*b* rotate, with respect to the one or more bearings 53, within the planet carrier 51. When the gears 49 are in the star arrangement, the one or more second gears 49*b*, being intermeshed with the third gear 49*c*, cause the third gear 49*c* to rotate about the longitudinal centerline axis 12. In such embodiments, the planet carrier 51 remains stationary such that the one or more second gears 49*b* do not rotate about the longitudinal centerline axis 12. When the gears 49 are in the planetary arrangement, the third gear 49*c* is stationary, and the one or more second gears 49*b* (and the planet carrier 51), rotate about the longitudinal centerline axis 12. When the gears 49 are in the differential gear arrangement, both the planet carrier 51 (e.g., the one or more second gears 49*b*) and the third gear 49*c* rotate about the longitudinal centerline axis 12.

As the gears 49 rotate, the lubrication system 100 supplies the lubricant 101 to the gear assembly (e.g., to at least one of the gears 49 or the one or more bearings 53) to lubricate the gear assembly (e.g., at least one of the gears 49 or the one or more bearings 53). During operation of the turbine engine 10, the lubricant pump 104 (FIG. 2) pumps the lubricant 101 from the tank 102 (FIG. 2) and into the gearbox assembly 46 through the lubricant supply line 106 (FIG. 2). The lubrication system 100 supplies the lubricant 101 to the gear assembly (e.g., at least one of the gears 49 or the one or more bearings 53). For example, the lubricant supply line 106 is in fluid communication with the gear assembly (e.g., the gears 49 or the one or more bearings 53).

The lubricant 101 drains from the gear assembly and into the sump 108. The lubricant 101 in the sump 108 drains from the sump 108 through the plurality of lubricant struts 37. When the aircraft is operating at level flight (e.g., the aircraft is not turning, not banking, or not rolling), the gearbox assembly 46 is in the first rotational position shown in FIG. 3A such that the six o'clock position of the gearbox assembly 46 is substantially at the bottom of the gearbox assembly 46. In such an orientation, the lubricant 101 drains from the sump 108 through the first lubricant strut 37*a* and into the scavenge reservoir 120.

The scavenge pump 124 then pumps the lubricant 101 from the scavenge reservoir 120 through the scavenge line 122 (FIG. 2) and to the tank 102. The lubricant pump 104 then re-circulates the lubricant 101 through the lubrication system 100 (e.g., through the lubricant supply line 106) and the gearbox assembly 46. In this way, the lubricant 101 can be re-used to lubricate the gear assembly.

During operation of the turbine engine 10, the lubricant 101 fills the sump 108 to a maximum lubricant level 109. The maximum lubricant level 109 is below the gear assembly such that the lubricant 101 in the sump 108 is prevented from contacting the gears 49 of the gear assembly (e.g., the third gear 49*c*) while the lubricant 101 is stored in the sump 108. The lubricant 101 drains through the first lubricant strut 37*a* and into the scavenge reservoir 120 to maintain a level of the lubricant 101 in the sump 108 at or below the maximum lubricant level 109.

Figure 3B:
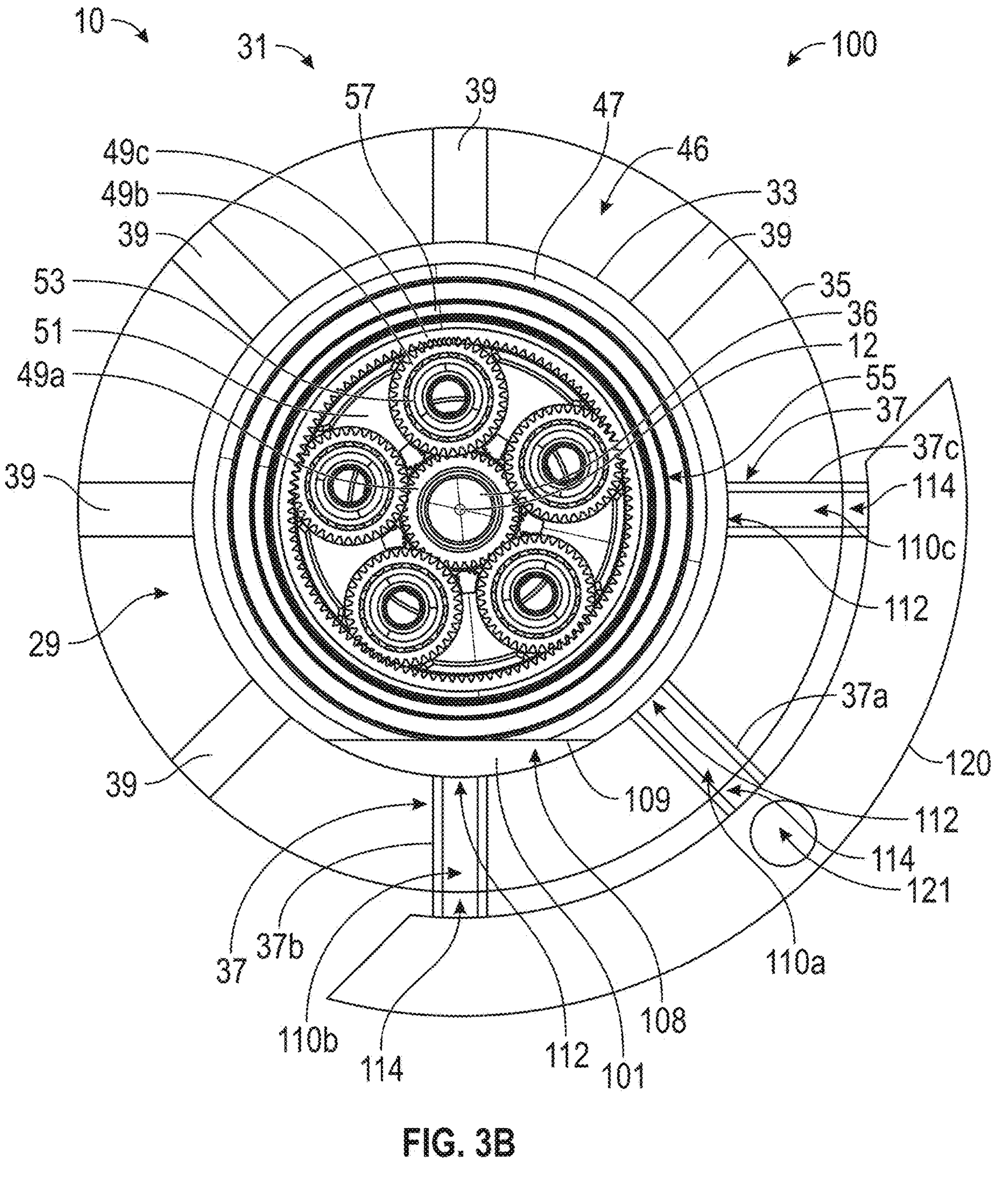
FIG. 3B is a schematic axial end view of the lubrication system of FIG. 3A with the turbine engine in a second rotational position, according to the present disclosure.

FIG. 3B shows the gearbox assembly 46 in a second rotational position. When the aircraft turns, banks, or rolls right, the gearbox assembly 46 is in the second rotational position shown in FIG. 3B such that the six o'clock position of the gearbox assembly 46 rotates right. In such an orientation, the second lubricant strut 37*b* is positioned at approximately the lowest point of the gearbox assembly 46 such that the lubricant 101 drains from the sump 108 through the second lubricant strut 37*b* (e.g., through the second lubricant strut flowpath 110*b*). The lubricant 101 can also drain through the first lubricant strut 37*a* in such a configuration if a level of the lubricant 101 in the sump 108 is at the first lubricant strut flowpath 110*a*. When the aircraft turns, banks, or rolls left, the gearbox assembly 46 is in a third rotational position such that the six o'clock position of the gearbox assembly 46 rotates left. In such an orientation, the third lubricant strut 37*c* is positioned at approximately the lowest point of the gearbox assembly 46 such that the lubricant 101 drains from the sump 108 through the third lubricant strut 37*c* (e.g., through the third lubricant strut flowpath 110*c*). Accordingly, the lubricant 101 can drain from the sump 108 into the scavenge reservoir 120 regardless of the rotational position of the gearbox assembly 46.

Thus, the lubricant 101 drains through at least one of the plurality of lubricant struts 37 (e.g., the first lubricant strut 37*a*, the second lubricant strut 37*b*, or the third lubricant strut 37*c*) and into the scavenge reservoir 120 to maintain a level of the lubricant 101 in the sump 108 at the maximum lubricant level 109. Such a configuration helps to ensure that the lubricant 101 in the sump 108 is constantly in fluid communication with at least one of the plurality of lubricant struts 37 even if the turbine engine 10 (e.g., the gearbox assembly 46 rotates. For example, the lubricant 101 in the sump 108 is in fluid communication with the first lubricant strut 37*a* in the first rotational position and is in fluid communication with the second lubricant strut 37*b* in the second rotational position. Thus, the lubrication system 100 disclosed herein prevents lubricant interruptions and prevents the lubricant 101 in the sump 108 from increasing beyond the maximum lubricant level 109 regardless of the rotational position of the turbine engine 10.

In some embodiments, the plurality of lubricant struts 37 includes at least one lubricant strut 37 circumferentially positioned to maintain contact with the lubricant 101 in the sump 108 when the turbine engine 10 is at a maximum roll angle. For example, the second lubricant strut 37*b* can be positioned at a circumferential positioned such that the lubricant 101 in the sump 108 contacts the second lubricant strut 37*b* when the turbine engine 10 is at the maximum roll angle. The maximum roll angle can include any roll angle between 0° and 360°. In this way, the plurality of lubricant struts 37 can include lubricant struts 37 spaced circumferentially about an entirety of the core air flowpath 29. In some embodiments, the maximum roll angle is between 0° and 30° or between 0° and −30° and the plurality of lubricant struts 37 includes lubricant struts 37 spaced partially circumferentially about the core air flowpath 29 to maintain contact with the lubricant 101 at the maximum roll angle.

Figure 4:
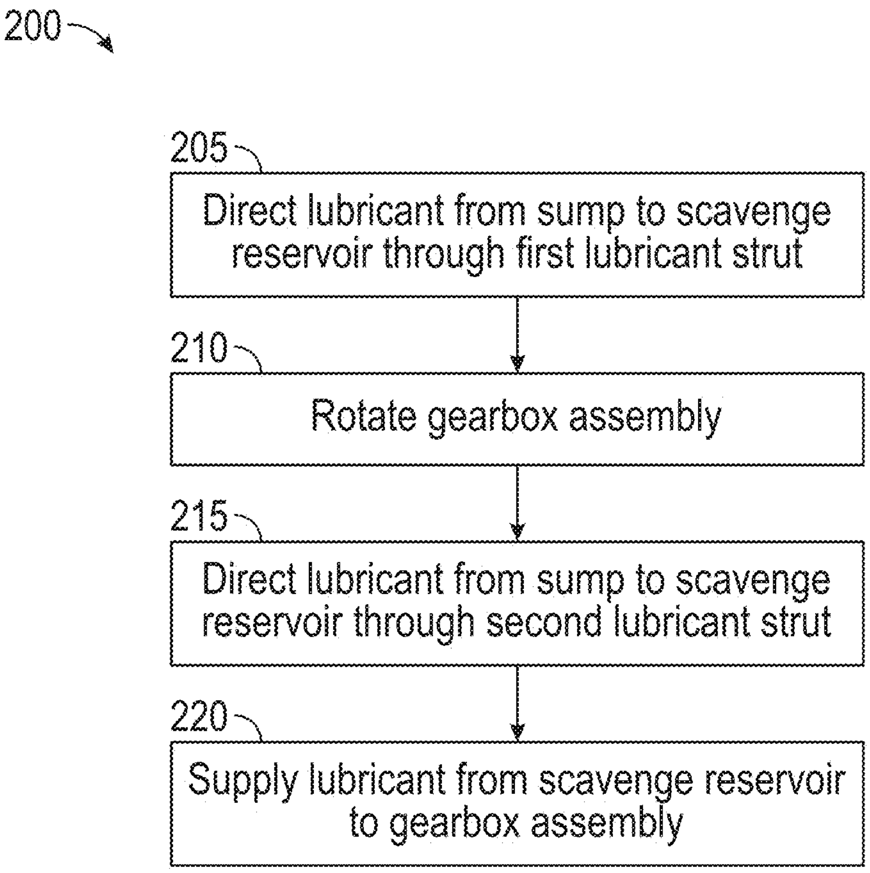
FIG. 4 is a flow chart showing a method of operating the turbine engine of FIGS. 1 to 3B, according to the present disclosure.

FIG. 4 is a flow chart showing a method 200 of operating the turbine engine 10, according to the present disclosure. Additional details of the method are described above relative to the operation and the description of the aforementioned components.

In step 205, the method 200 includes directing the lubricant 101 from the sump 108 to the scavenge reservoir 120 through the first lubricant strut 37*a*. In particular, the first lubricant strut flowpath 110*a* directs the lubricant 101 from the sump 108 through the lubricant strut flowpath inlet 112 and into the scavenge reservoir 120 through the lubricant strut flowpath outlet 114. In this way, the lubricant 101 fills the scavenge reservoir 120 through the first lubricant strut 37*a* in the first rotational position.

In step 210, the method 200 includes rotating the gearbox assembly 46. For example, when the turbine engine 10 powers an aircraft, the aircraft turns, banks, or rolls such that the turbine engine 10, and, thus, the gearbox assembly 46, rotates and changes the rotational position to the second rotational position. The lubricant 101 in the sump 108 remains at the six o'clock position due to gravity when the gearbox assembly 46 rotates. Thus, the sump 108 is no longer in fluid communication with the first lubricant strut 37*a* in the second rotational position. In such a position, the lubricant 101 in the sump 108 is in fluid communication with the second lubricant strut 37*b*.

In step 215, the method 200 includes directing the lubricant from the sump 108 to the scavenge reservoir 120 through the second lubricant strut 37*b*. In particular, the second lubricant strut flowpath 110*b* directs the lubricant 101 from the sump 108 through the lubricant strut flowpath inlet 112 and into the scavenge reservoir 120 through the lubricant strut flowpath outlet 114. In this way, the lubricant 101 fills the scavenge reservoir 120 through the second lubricant strut 37*b* in the second rotational position. The third lubricant strut 37*c* can similarly direct the lubricant 101 through the third lubricant strut flowpath 110*c* into the scavenge reservoir 120 when the gearbox assembly 46 is in the third rotational position. In some embodiments, the method 200 also includes directing the lubricant 101 from the sump 108 to the scavenge reservoir 120 through at least one lubricant strut 37 when the turbine engine 10 is at the maximum roll angle.

In step 220, the method 200 includes supplying the lubricant 101 from the scavenge reservoir 120 to the gearbox assembly 46. In particular, the scavenge pump 124 pumps the lubricant 101 from the scavenge reservoir 120 through the scavenge reservoir outlet 121, and to the tank 102. The scavenge line 122 directs the lubricant 101 from the scavenge reservoir 120 to the tank 102. The lubrication system 100 then supplies the lubricant 101 back to the gearbox assembly 46, as detailed above.

Accordingly, the lubrication system and methods disclosed above allow for draining of the lubricant 101 into the scavenge reservoir 120 despite the gearbox assembly 46 being in a rotated position when an aircraft rotates. This prevents flooding of the gearbox assembly 46 and allows the lubrication system 100 to continue to cycle the lubricant 101 through the gears 49 consistently, even when the aircraft is in a rotated position. The lubrication system 100 disclosed herein prevents lubricant interruptions and prevents the lubricant 101 in the sump 108 from increasing beyond the maximum lubricant level 109 regardless of the rotational position of the turbine engine 10. Thus, the lubrication system 100 prevents the lubricant 101 from filling the sump 108 beyond the maximum lubricant level 109, and thus, prevents the gears 49 from being submerged in the lubricant 101. Accordingly, the lubrication system 100 prevents excess windage in the gearbox assembly 46.

Further aspects are provided by the subject matter of the following clauses.

A turbine engine comprising a turbo-engine having a core air flowpath, a fan drivingly coupled to the turbo-engine, a frame that supports the core air flowpath, the frame including a plurality of lubricant struts that extends through the core air flowpath, and a lubrication system comprising a sump having a lubricant therein; a scavenge reservoir, and a lubricant strut flowpath disposed through each of the plurality of lubricant struts, the lubricant strut flowpath being in fluid communication with the sump and the scavenge reservoir, wherein the lubricant strut flowpath of each of the plurality of lubricant struts directs the lubricant from the sump to the scavenge reservoir.

The turbine engine of the preceding clause, wherein the lubrication system further comprises a scavenge pump in fluid communication with the scavenge reservoir for pumping the lubricant from the scavenge reservoir.

The turbine engine of any preceding clause, wherein the scavenge reservoir is positioned radially outward of the core air flowpath.

The turbine engine of any preceding clause, wherein the scavenge reservoir extends partially circumferentially about the core air flowpath.

The turbine engine of any preceding clause, wherein the frame includes a radially inner frame wall and a radially outer frame wall, the core air flowpath being defined between the radially inner frame wall and the radially outer frame wall, and the plurality of lubricant struts extending from the radially inner frame wall to the radially outer frame wall.

The turbine engine of the preceding clause, wherein the scavenge reservoir is positioned radially outward of the radially outer frame wall.

The turbine engine of any preceding clause, wherein the plurality of lubricant struts includes a first lubricant strut having a first lubricant strut flowpath that directs the lubricant from the sump to the scavenge reservoir when the turbine engine is at a first rotational position.

The turbine engine of the preceding clause, wherein the plurality of lubricant struts includes a second lubricant strut having a second lubricant strut flowpath that directs the lubricant from the sump to the scavenge reservoir when the turbine engine is at a second rotational position.

The turbine engine of any preceding clause, wherein the sump includes a maximum lubricant level, the lubricant in the sump maintains contact with at least one of the plurality of lubricant struts when the turbine engine rotates such that the lubricant is maintained at or below the maximum lubricant level.

The turbine engine of the preceding clause, wherein the plurality of lubricant struts includes at least one lubricant strut circumferentially positioned to maintain contact with the lubricant in the sump when the turbine engine is at a maximum roll angle.

The turbine engine of any preceding clause, further comprising a gearbox assembly including a plurality of gears, the fan being drivingly coupled to the turbo-engine through the gearbox assembly.

The turbine engine of the preceding clause, wherein the sump is defined radially outward of the plurality of gears.

The turbine engine of any preceding clause, wherein the lubrication system further comprises a tank for storing the lubricant therein, a lubricant pump, and a lubricant supply line in fluid communication with the tank and the gearbox assembly, the lubricant pump pumping the lubricant from the tank to the gearbox assembly through the lubricant supply line to lubricate the plurality of gears.

The turbine engine of any preceding clause, wherein the lubricant strut flowpath includes a lubricant strut flowpath inlet in fluid communication with the sump, the lubricant strut flowpath inlet directing the lubricant from the sump into the lubricant strut flowpath.

The turbine engine of any preceding clause, wherein the lubricant strut flowpath includes a lubricant strut flowpath outlet in fluid communication with the scavenge reservoir, the lubricant strut flowpath outlet directing the lubricant from the lubricant strut flowpath into the scavenge reservoir.

The turbine engine of any preceding clause, further comprising a scavenge line in fluid communication with the scavenge reservoir and the tank, the scavenge line directing the lubricant from the scavenge reservoir to the tank.

The turbine engine of any preceding clause, wherein the scavenge reservoir includes a scavenge reservoir outlet in fluid communication with the scavenge line, the scavenge reservoir outlet directing the lubricant from the scavenge reservoir to the scavenge line.

A method of operating the turbine engine of any preceding clause, the method comprising: directing the lubricant from the sump to the scavenge reservoir through the lubricant strut flowpath of one or more of the plurality of lubricant struts based on a rotational positional of the turbine engine.

The method of the preceding clause, wherein the turbine engine includes a gearbox assembly including a plurality of gears, the fan being drivingly coupled to the turbo-engine through the gearbox assembly, the lubrication system further comprises a tank for storing the lubricant therein, a lubricant pump, and a lubricant supply line in fluid communication with the tank and the gearbox assembly, and the method further comprising pumping the lubricant with the lubricant pump from the tank to the gearbox assembly through the lubricant supply line to lubricate the plurality of gears.

The method of any preceding clause, wherein the lubrication system further comprises a scavenge pump in fluid communication with the scavenge reservoir, the method further comprising pumping the lubricant from the scavenge reservoir with the scavenge pump.

The method of any preceding clause, wherein the plurality of lubricant struts includes a first lubricant strut having a first lubricant strut flowpath, the method further comprising directing the lubricant from the sump to the scavenge reservoir with the first lubricant strut flowpath when the turbine engine is at a first rotational position.

The method of the preceding clause, wherein the plurality of lubricant struts includes a second lubricant strut having a second lubricant strut flowpath, the method further comprising directing the lubricant from the sump to the scavenge reservoir when the turbine engine is at a second rotational position.

The method of any preceding clause, wherein the sump includes a maximum lubricant level, the method further comprising maintaining the lubricant in the sump at or below the maximum lubricant level by maintaining contact of the lubricant with at least one of the plurality of lubricant struts when the turbine engine rotates.

The method of the preceding clause, wherein the plurality of lubricant struts includes at least one lubricant strut circumferentially positioned to maintain contact with the lubricant in the sump when the turbine engine is at a maximum roll angle, the method further comprising directing the lubricant from the sump to the scavenge reservoir through the at least one lubricant strut when the turbine engine is at the maximum roll angle.

The method of any preceding clause, further comprising directing the lubricant from the sump into the lubricant strut flowpath through a lubricant strut flowpath inlet of the lubricant strut flowpath.

The method of any preceding clause, further comprising directing the lubricant from the lubricant strut flowpath into the scavenge reservoir through a lubricant strut flowpath outlet of the lubricant strut flowpath.

The method of any preceding clause, further comprising directing the lubricant from the scavenge reservoir to the tank through a scavenge line.

The method of any preceding clause, further comprising directing the lubricant from the scavenge reservoir to the scavenge line through a scavenge reservoir outlet of the scavenge reservoir.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:

a turbo-engine having a core air flowpath;

an annular frame including a radially inner frame wall and a radially outer frame wall, the radially inner frame wall and the radially outer frame wall defining the core air flowpath of the turbo-engine therebetween; and a lubrication system comprising:

a sump having a lubricant therein;

a scavenge reservoir extending at least partially circumferentially about the core air flowpath, the scavenge reservoir having a continuous volume extending radially outward of the core air flowpath; and a plurality of lubricant struts that extends through the core air flowpath, each of the plurality of lubricant struts defining a lubricant strut flowpath therein, the lubricant strut flowpath having a lubricant strut flowpath inlet in fluid communication with the sump and a lubricant strut flowpath outlet in fluid communication with the scavenge reservoir, to direct the lubricant from the sump to the scavenge reservoir.

2. The turbine engine of claim 1, wherein the lubrication system further comprises a scavenge pump in fluid communication with the scavenge reservoir for pumping the lubricant from the scavenge reservoir.

3. The turbine engine of claim 1, wherein the scavenge reservoir is positioned radially outward of the core air flowpath.

4. The turbine engine of claim 1, wherein the plurality of lubricant struts extends from the radially inner frame wall to the radially outer frame wall.

5. The turbine engine of claim 4, wherein the scavenge reservoir is positioned radially outward of the radially outer frame wall.

6. The turbine engine of claim 1, wherein the plurality of lubricant struts includes a first lubricant strut having a first lubricant strut flowpath that directs the lubricant from the sump to the scavenge reservoir when the turbine engine is at a first rotational position.

7. The turbine engine of claim 6, wherein the plurality of lubricant struts includes a second lubricant strut having a second lubricant strut flowpath that directs the lubricant from the sump to the scavenge reservoir when the turbine engine is at a second rotational position.

8. The turbine engine of claim 1, wherein the sump includes a maximum lubricant level, the lubricant in the sump maintains contact with at least one of the plurality of lubricant struts when the turbine engine rotates such that the lubricant is maintained at or below the maximum lubricant level.

9. The turbine engine of claim 8, wherein the plurality of lubricant struts includes at least one lubricant strut circumferentially positioned to maintain contact with the lubricant in the sump when the turbine engine is at a maximum roll angle.

10. The turbine engine of claim 1, further comprising a gearbox assembly including a plurality of gears, a fan being drivingly coupled to the turbo-engine through the gearbox assembly.

11. The turbine engine of claim 10, wherein the sump is defined radially outward of the plurality of gears.

12. The turbine engine of claim 10, wherein the lubrication system further comprises a tank for storing the lubricant therein, a lubricant pump, and a lubricant supply line in fluid communication with the tank and the gearbox assembly, the lubricant pump pumping the lubricant from the tank to the gearbox assembly through the lubricant supply line to lubricate the plurality of gears.

13. The turbine engine of claim 12, wherein the lubrication system further comprises a scavenge line in fluid communication with the scavenge reservoir and the tank, the scavenge line directing lubricant from the scavenge reservoir to the tank.

14. A method of operating the turbine engine of claim 1, the method comprising:

directing the lubricant from the sump to the scavenge reservoir through the lubricant strut flowpath of one or more of the plurality of lubricant struts based on a rotational position of the turbine engine.

15. The method of claim 14, wherein the turbine engine includes a gearbox assembly including a plurality of gears, a fan being drivingly coupled to the turbo-engine through the gearbox assembly, the lubrication system further comprises a tank for storing the lubricant therein, a lubricant pump, and a lubricant supply line in fluid communication with the tank and the gearbox assembly, and the method further comprising pumping the lubricant with the lubricant pump from the tank to the gearbox assembly through the lubricant supply line to lubricate the plurality of gears.

16. The method of claim 14, wherein the lubrication system further comprises a scavenge pump in fluid communication with the scavenge reservoir, the method further comprising pumping the lubricant from the scavenge reservoir with the scavenge pump.

17. The method of claim 14, wherein the plurality of lubricant struts includes a first lubricant strut having a first lubricant strut flowpath, the method further comprising directing the lubricant from the sump to the scavenge reservoir with the first lubricant strut flowpath when the turbine engine is at a first rotational position.

18. The method of claim 17, wherein the plurality of lubricant struts includes a second lubricant strut having a second lubricant strut flowpath, the method further comprising directing the lubricant from the sump to the scavenge reservoir with the second lubricant strut flowpath when the turbine engine is at a second rotational position.

19. The method of claim 14, wherein the sump includes a maximum lubricant level, the method further comprising maintaining the lubricant in the sump at or below the maximum lubricant level by maintaining contact of the lubricant with at least one of the plurality of lubricant struts when the turbine engine rotates.

20. The method of claim 19, wherein the plurality of lubricant struts includes at least one lubricant strut circumferentially positioned to maintain contact with the lubricant in the sump when the turbine engine is at a maximum roll angle, the method further comprising directing the lubricant from the sump to the scavenge reservoir through the at least one lubricant strut when the turbine engine is at the maximum roll angle.

* * * * *